United States Patent

[11] 3,568,147

[72] Inventor Paul R. Gilson
 Santa Ana, Calif.
[21] Appl. No. 804,187
[22] Filed Mar. 4, 1969
[45] Patented Mar. 2, 1971
[73] Assignee North American Rockwell Corporation

[54] TRANSIENT FILTER SYSTEM
 4 Claims, 7 Drawing Figs.
[52] U.S. Cl. .................................................. 340/146.1,
 325/42, 328/111, 328/151, 340/172
[51] Int. Cl. ....................................................... G08c 25/00
[50] Field of Search ........................................... 340/146.1,
 172; 328/115, 151, 111; 307/234, 235; 325/42

[56] References Cited
UNITED STATES PATENTS
3,386,079 5/1968 Wiggins ....................... 340/146.1
3,386,081 5/1968 Varsos ......................... 340/146.1X
3,420,993 1/1969 Chamberlain, et al. ..... 340/172X
3,478,266 11/1969 Gardenhire, et al. ....... 340/172X Primary Examiner—Eugene G. Botz
Assistant Examiner—Charles E. Atkinson
Attorneys—William R. Lane, L. Lee Humphries and Robert G. Rogers ABSTRACT: Data samples transmitted from one location to another are separated in time and serially compared to determine transmission errors. Several sequential data samples are compared and the intermediate value of the monotonic order is selected as representing the true value. Transient errors which would cause a data sample to be in error are then automatically eliminated and the data sample having the value nearest the data sample caused to be in error is inserted in its place.

INVENTOR.
PAUL R. GILSON
BY Robert G. Rogers
ATTORNEY

INVENTOR.
PAUL R. GILSON

TRANSIENT FILTER SYSTEM

BACKGROUND OF THE INVENTION

1. Field of the Invention

This invention relates to an improved filter system for minimizing errors in sampled data due to transient conditions and more particularly to such a filter in which the errors are minimized by comparing adjacent data samples and selecting intermediate sample values to represent the data at each interval.

2. Description of Prior Art

Redundancy checks are used in electronic systems to decrease errors in data which can be sampled over a period of time. For example, data transmitted from one location can easily be time sampled. Redundancy can be achieved in many forms depending upon the anticipated type of error.

From a practical data system viewpoint, there are three basic types of errors that must be detected. First, there are the errors associated with the input and output signal conditioning. These errors are associated with the input and output terminals and cannot be detected by redundancy checks. Special tests must be designed for each class of input or output errors.

The second type of error is the steady state component failure associated with the data-handling equipment. These errors may be detected by voting techniques in the case of three or more parallel data paths or by special test signals in the case of only two parallel data paths.

The third type of errors are the environmentally induced transient errors which can be detected by redundancy checks as indicated above. The present invention is concerned with the third type of error.

SUMMARY OF THE INVENTION

Briefly, the invention comprises means for filtering transient errors in data wherein the errors are detected by comparing data samples representing data values and wherein the errors are minimized by selecting the intermediate data sample value to represent the data at a particular time interval.

In one embodiment, the intermediate data sample value of three serially displaced samples is selected as the data sample representing the data value. During the next interval, the samples are serially shifted so that for each comparison, one additional sample is used in lieu of one of the previous samples. A data sample may be represented by a signal having a pulse width as a function of the data value at the time it is being sampled.

In another embodiment, the previously selected data sample is substituted for one of the three incoming data samples for purpose of the comparison. The sample then selected is the intermediate value of the two new data samples and the previously selected sample. The comparisons in both embodiments can be made digitally or by comparing analogue voltage levels.

A system which filters transient errors from a serial array of data is useful in rejecting environmentally induced errors present in serial data transmissions. When data is transmitted in parallel, the respective data paths may be conveniently displaced in time to present serially arrayed data samples to the filter for enabling the transients to be eliminated as described above.

The output from the filter is used for whatever purpose the original data was intended. In some applications, the data can be used to drive a motor whereas in other applications, the data may be stored. The particular use depends on a particular system application.

Therefore, it is an object of this invention to provide an improved filter system for detecting and minimizing transient errors in time sequential data.

It is another object of the invention to provide an improved filter for environmentally induced transient errors in data having a serial or parallel array.

Still another object of the invention is to utilize digital or analogue comparison techniques for comparing signals representing data samples for filtering transient errors in the data.

A still further object of the invention is to provide redundant data transmission paths for enabling comparisons between the data on the paths to determine transient errors.

Another object of the invention is to provide a filter for transient errors in serially arrayed data in which adjacent samples of the data are compared and, wherein the intermediate sample is selected to represent the data at a particular time interval.

A further object of the invention is to provide a transient filter in which a data sample at a particular interval is stored and compared with adjacent data samples at a different interval for changing the stored value as a function of the difference between the compared sample.

These and other objects will become more apparent in light of the description of invention, a brief description of the drawings of which follows.

DESCRIPTION OF PREFERRED EMBODIMENTS

Figure 1:
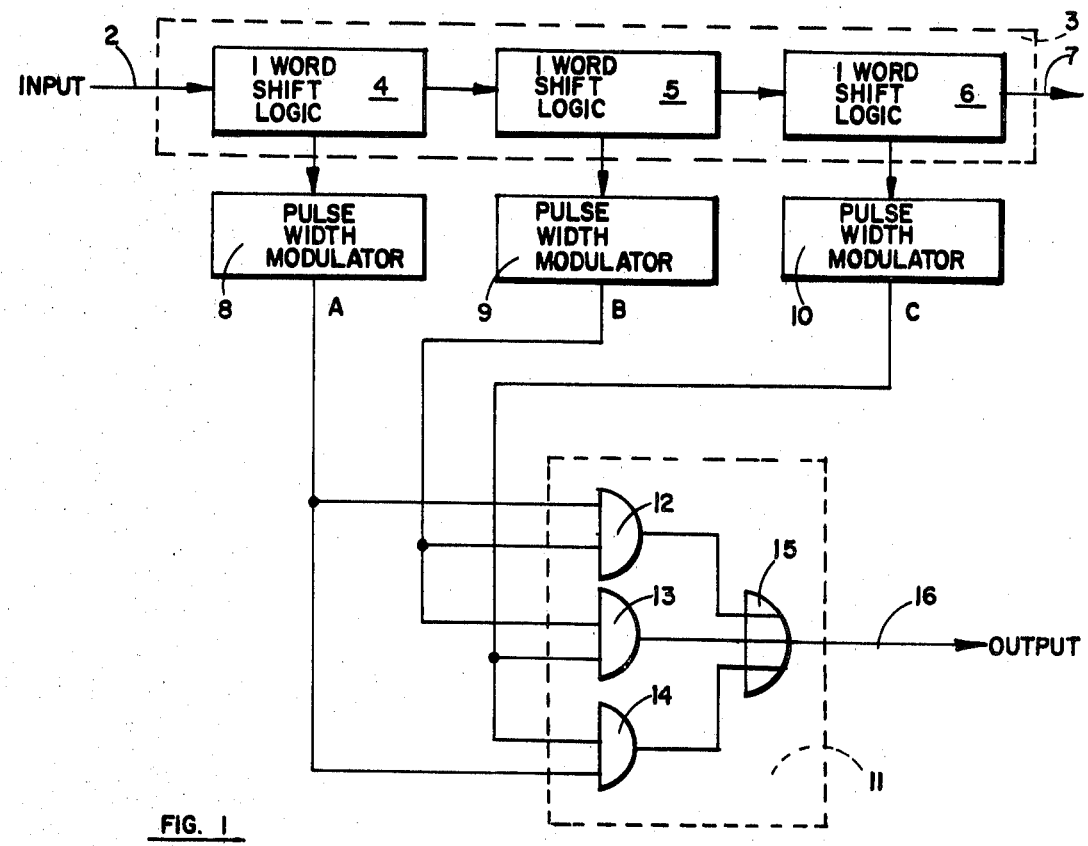
FIG. 1 is a schematic illustration of a system for comparing adjacent signal values of serially transmitted data for detecting and minimizing transient errors.

FIG. 1 is a schematic illustration of one embodiment of filter system 1 which receives serial data samples of data representing a particular function. The data may, for example, be a series of time sequential pulse code modulated (PCM) serial words. The data sample could also be a binary word having a value corresponding to the value of, for example, a trigonometric function at a particular interval. Three adjacent samples are stored in shift register 3 comprising three one-word shift registers 4, 5, and 6 connected in series between input line 2 and line 7. Line 7 is of no particular significance to the system. It serves only as an output for the overflow from shift register 3.

The three pulse code modulated words are converted into pulse width modulated signals A, B, and C (see FIGS. 2, 3 and 4) by modulators 8, 9, and 10. The signals are then compared by digital logic 11 to produce the function $$AB + BC + CA,$$

at output 16. The output signal may, for example, be transmitted to an analogue integrator for conversion to a conventional analogue form.

The logic 11 comprises AND gate 12 for producing the AB output, AND gate 13 for producing the BC output, and AND gate 14 for producing the CA output. The ANDed outputs are OR'ed together by OR gate 15 to produce the above function.

The function of the digital logic 11 is to automatically select the pulse width modulated signal that has a width between the other two signals. Examples are shown in FIGS. 2, 3 and 4.

Figure 2:
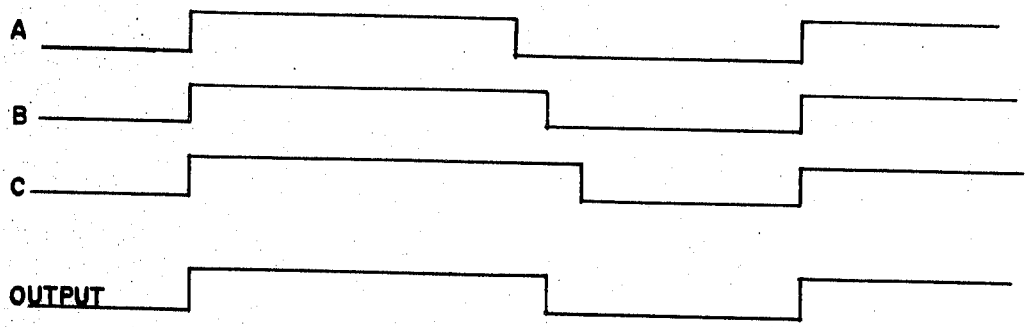
FIG. 2 is an illustration of three signals used in comparing adjacent data samples of data representing a function, in which each of the signals shows a normal increase.

FIG. 2 illustrates an example of three data samples represented pulse width modulated signals A, B, and C. Since the B signal has a width between the other two, it is selected as an output on line 16.

During the next comparison interval, the C signal is shifted out of register 3 so that the new order becomes, for example, ZAB. If the data is still normal, i.e., no transient disturbance, the A signal is selected at the output 16. For the comparison period prior to the A, B, C comparison interval, for normal conditions, the C signal was selected. In effect, the filter delays the output on line 16 for one comparison interval.

Figure 3:
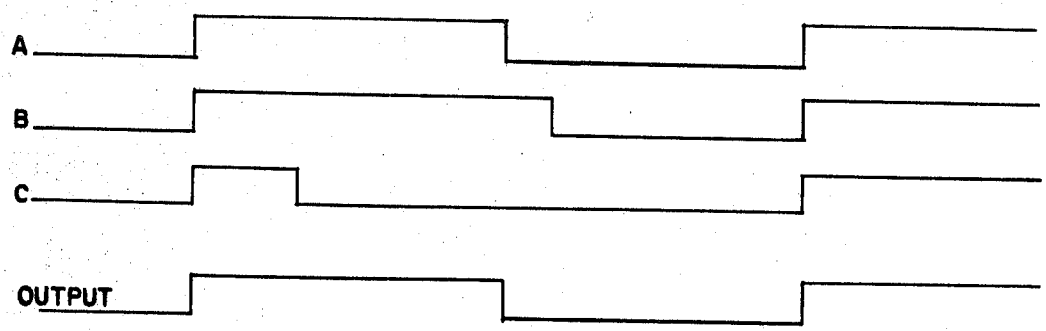
FIG. 3 is an illustration of three signals used in comparing adjacent data samples representing a function in which one signal is reduced by a transient error.
Figure 4:
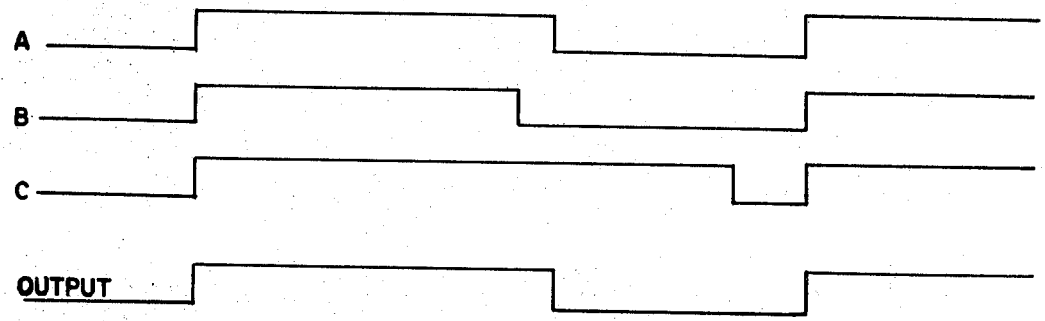
FIG. 4 is an illustration of three signals used in comparing adjacent data samples representing a function in which one signal is increased by a transient error.

FIG. 3 illustrates an example of three data samples represented by pulse width modulated signals A, B, C, wherein the pulse width of the C signal was substantially reduced by a transient. As a result, the A signal is selected since it has a width between the B and C signal. The C signal is ignored. In other words, the output from OR gate 15 remains true until the AB output from AND gate 12 becomes false. By that time, the BC and CA outputs will have already been false. In the previous example, the output from AND gate 13 determined the period OR gate 16 remained on.

FIG. 4 illustrates an example of three data samples represented by pulse width modulated signal A, B, and C wherein a transient condition substantially increased the width of the C signal. As a result, the A signal appears on output line 16 so that the effect of the transient error is substantially reduced. The maximum error in the output signal is equal to the difference in width between the A and B signals. Without the filter, the data sample represented by the C signal would not have been replaced by the data sample represented by the A signal. As a result, the function comprised of data from which the samples were selected on a time basis would have included the error. The present system automatically rejects data samples which are in error in favor of the closest data sample to the rejected sample, as described in connection with FIGS. 2, 3 and 4.

Although FIG. 1 system illustrates a comparison of three serial data samples, other embodiments can be used to compare data samples which are not necessarily time dependent. For example, in a triple redundant data transmission system wherein data samples are placed in three parallel registers, the system selects the best of the three signals. If the three redundant transmission paths are dispersed in time, the system takes on the properties of both a signal filter and a redundant two out of three volter.

Figure 5:
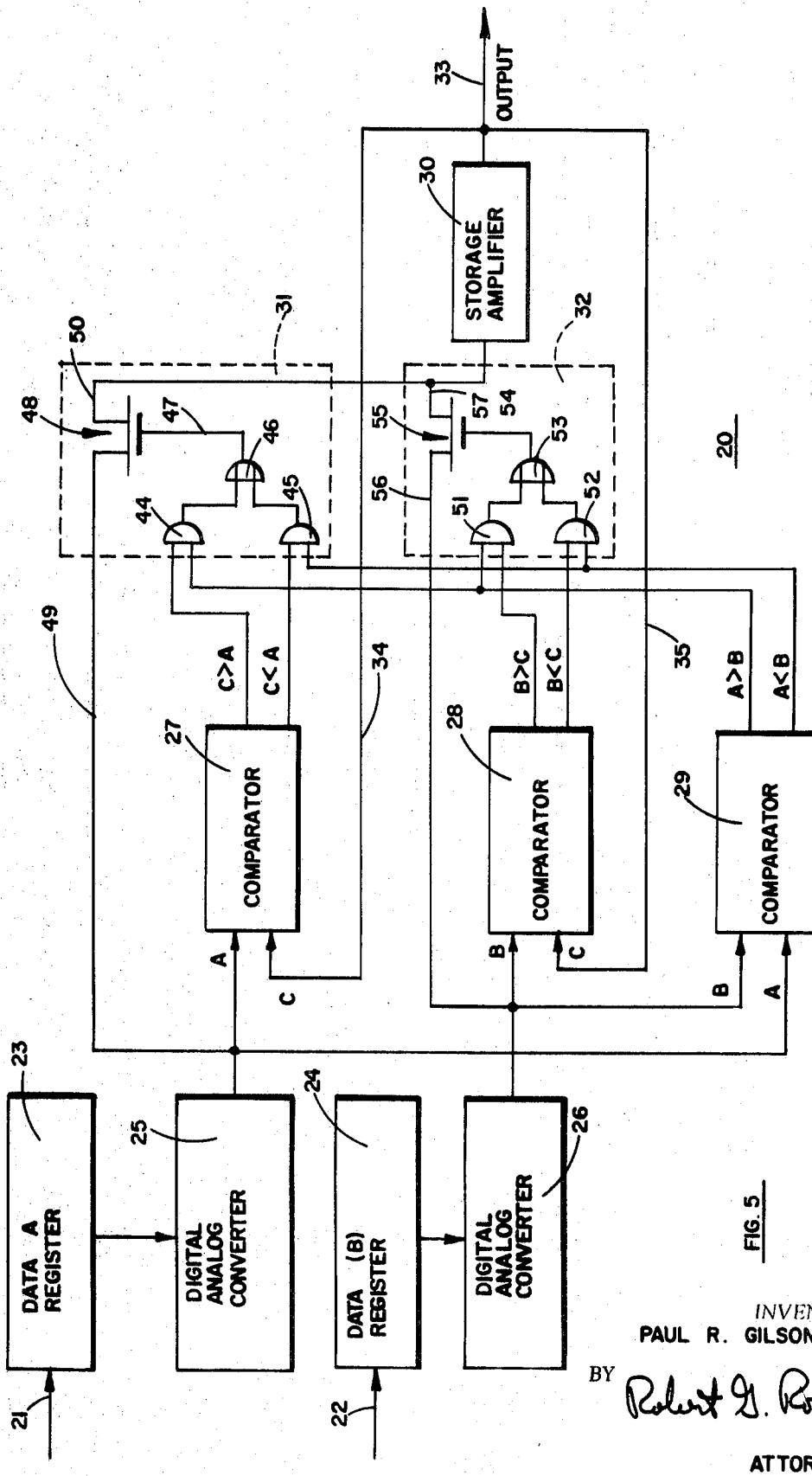
FIG. 5 is a schematic illustration of a filter using comparison and storage techniques for detecting and minimizing transient errors.

FIG. 5 illustrates an embodiment of a filter 20 which can be implemented by circuitry which receives data samples, converts the samples into samples for comparison and then stores one of the signals for the next comparison. The circuitry is ordinarily described as "sample and hold" circuitry. The FIG. 5 embodiment is described for use in a dual redundant multiplexer system although it may be adapted for other applications.

The filter 20 comprises primary data input 21 and secondary data input 22 which provides data samples into registers 23 and 24, respectively. For the particular embodiment shown, the data samples are in the form of digital words which are converted into analogue signals by digital to analogue converters 25 and 26 for registers 23 and 24, respectively. Outputs from the digital to analogue converters 25 and 26 provide comparison signals, A and B, to comparators 27, 28 and 29. Another input C is provided to the comparators by storage amplifier 30. Comparator 27 generates outputs indicating which is greater A or C. Comparator 28 generates outputs to indicate which is greater B or C. Comparator 29 generates outputs to indicate which is greater A or B.

Switch 31 comprises AND gates 44 and 45 having inputs C>A; A>B; and C<A; A<B, respectively. The outputs of the AND gates are connected as inputs to OR gate 46. The output from OR gate 46 provides a drive voltage for gate electrode 47 of field effect device 48. Electrode 49 of device 48 is connected to the A input of comparator 27. Electrode 50 is connected to the output from switch 32 to provide an input to amplifier 30.

Switch 32 is similarly implemented by AND gates 51 and 52 having inputs B>C; A>B and B<C; A<B, respectively. The outputs of the AND gates are connected as inputs to OR gate 53. The output from OR gate 53 provides a drive voltage for the gate electrode 54 of field effect device 55. Electrode 56 of the device 55 is connected to the B input of comparator 28. Electrode 57 of device 55 is connected to the output from switch 31 to provide the input to amplifier 30. There is no necessity for a third switch at the output of comparator 29. Comparators and amplifiers for storing an output level are believed well known in the art and for that reason additional details are omitted.

Switching logic 31 and 32 are connected between the outputs of the comparators 27 and 28, and 29, and the input to the storage amplifier 30. Only one switch (31 or 32) can be closed at the end of a comparison interval and under certain conditions, i.e., when $$(B>C)(C>A)+(B<C)(C<A) \qquad (1)$$

both switches remain open. The C signal previously stored by amplifier 30 represents the data sample at that interval. That signal appears on line 33.

The switches are opened and closed as a function of the relative values of the data samples represented by the analogue signals. For example, switch 31 is closed when $$(B>A)(A>C)+(B<A)(A<C) \qquad (2)$$

Similarly, switch 32 is closed when $$(A>B)(B>C)+(A<B)(B<C) \qquad (3)$$

In operation, the A, B and C signals are compared in magnitude. The signal having the intermediate magnitude is used to update the signal stored by amplifier 30 by connecting either the A or B input signals to the input of amplifier 30 through either field effect device 48 or 55. If the output is to remain unchanged, both devices are turned off. The single transient error which may have appeared in one of the data words is thus excluded from the analogue output on line 33.

It is pointed out that the pair of data samples represented by signals A and B need not be displaced in time if only the voter system is desired. However, for transient filter operations, the samples must be displaced in time.

The storage registers, digital analogue converters, comparators, and the switching logic may be time shared by a plurality of sample and hold storage amplifiers. In that case, additional switches must be connected in the feedback line 34 and 35 between the output of storage amplifier 30 and comparators 27 and 28.

Figure 6:
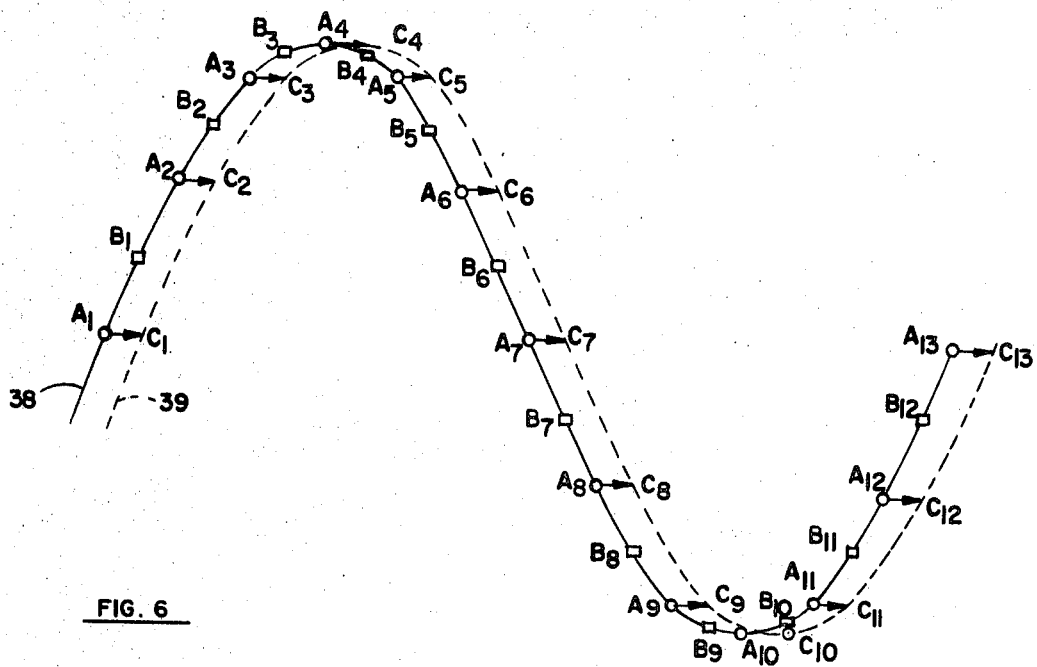
FIG. 6 is an illustration of a reproduction of a sine wave from data transmitted without transient errors.

A more specific example of the operation of the FIG. 5 system is described in connection with FIGS. 6 and 7. FIG. 6 is an illustration of sine wave 38 represented by data points $A_1$, $B_1$, through $A_{13}$, $B_{12}$, and sine wave 39 represented by data points $C_0$ through $C_{13}$.

Data samples, such as digital words having values as a function of the data point, are represented, as previously described, by sequential analogue signals at the inputs to comparators 27, 28 and 29. The C input signal, selected from a previous comparison, is provided as an output of amplifier 30.

In reproducing sine wave function 38, filter 20 examines three adjacent data samples of the function and then decides which of the three samples more accurately represents the data at each time interval of the reproduced curve 39. The phase shift from signal 38 to signal 39 is directly proportional to the frequency of the sine wave so that distortion is not produced when reproducing functions having frequencies within the bandwidth of the system 20.

In FIG. 6, initially signals representing data samples at points $A_1$ and $B_1$ are compared with the signal $C_0$ previously stored in amplifier 30. Since $B_1$ is greater than $A_1$ and $A_1$ is greater than $C_0$, switch 31 is closed so that the signal representing the data sample at point $A_1$ displaces the stored signal $C_0$ in amplifier 30. The amplifier then contains a $C_1$ signal. During the next comparison interval, signals representing data samples at points $A_2$ and $B_2$ are compared with each other and with the $C_1$ signal in amplifier 30. Since there are no transient disturbances, $B_2$ is greater than $A_2$ and $A_2$ is greater than $C_1$ so that the signal representing data point $A_2$ is used to update the data stored by amplifier 29. Amplifier 29 than stores the signal indicated as data point $C_2$ on the dotted sine wave 39. The process is repeated until the entire function is reproduced.

Figure 7:
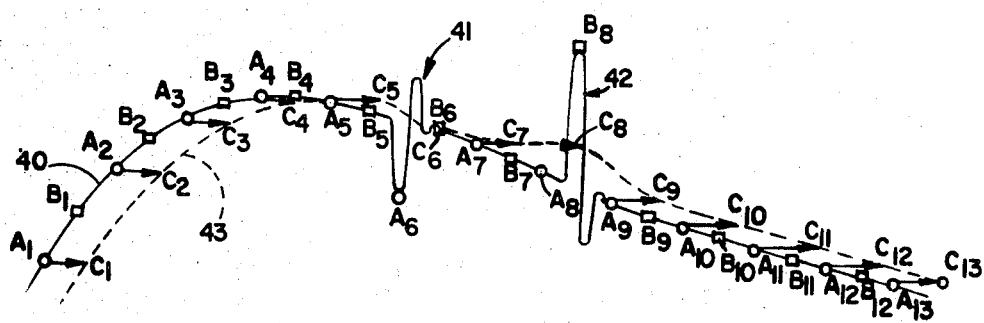
FIG. 7 illustrates a smooth function on which transients have been superimposed to show how the system detects and reduces the error.

FIG. 7 illustrates a smooth function 40 with transients 41 and 42 superimposed to illustrate how the system reduces the error caused by the transients. The dotted signal represents the output function 43 appearing on line 33 of FIG. 5. The original function 40 is represented by the unbroken line. Until the time interval in which the transient occurs, the comparison proceeds as described in connection with FIG. 6. At the interval beginning with points $A_6$ and $B_6$, the signal representing the data sample at point $A_6$ is compared with the signal representing the data sample at point $B_6$. Both signals are also compared with the previously stored $C_5$ signal. The comparison is made in accordance with the right-hand side of equation (2) described above. As indicated by the equation, since $A_6$ is not greater than $B_6$ and $B_6$ is not greater than $C_5$, switch 32 is closed so that the $C_5$ information in amplifier 29 is replaced by the $B_6$ information. As a result, instead of the dotted curve following the transitions of transient 41, it follows very closely to the path the curve would have followed had the transient 41 not occurred.

A similar comparison is made in connection with the larger transient 42. Signals representing data samples at points $A_8$ and $B_8$ are compared with each other and with the $C_7$ signal representing the data sample for point $C_7$ on the reproduced function 41 at output 33. Since $B_8$ is greater than $C_7$ and $C_7$ is greater than $A_8$, the switches 31 and 32 are not actuated and the output remains the same as the previous point $C_7$. In other words, point $C_8$ is the same as point $C_7$ since the $C_7$ data was between the $B_8$ and $A_8$ data. As a result, the dotted curve follows approximately the curve that would have occurred had not the transient been imposed.

It is pointed out that although the embodiments described herein are in terms of systems for comparing signals representing three adjacent data samples, the invention is not limited to that number or to adjacent data samples. In certain systems 4, 5, or even 6 data samples may be compared. The data samples may be adjacent or a plurality of alternate data samples could be compared.

While the invention has been described with respect to several physical embodiments constructed in accordance therewith, it will be apparent to those skilled in the art that various modifications and improvements may be made without departing from the scope and spirit of the invention.

I claim:

1. A system for reducing transient errors in transmitted data comprising:
   means for storing pulse code modulated data signals in serial form during a particular time interval including means for replacing one pulse code modulated data signal with a new pulse code modulated data signal during a succeeding time interval;
   means for converting from said pulse code modulated data signals in serial form to pulse width modulated signals in parallel form; and
   digital logic circuit means receiving said pulse width modulated signals representing data signals stored from a particular time interval and a data signal from said succeeding time interval, said logic circuit means providing a pulse width modulated output signal having a pulse width that is between the broadest and narrowest pulse width of said pulse width modulated signals received.

2. The system recited in claim 1 wherein said means for storing comprises a shift register for storing three pulse code modulated data signals in serial form, said means for replacing including logic for shifting one stored data signal out of said shift register and for gating in a new data signal during each time interval whereby said shift register contains two pulse modulated data signals from a preceding time interval and one pulse code-modulated data signal from the succeeding time interval.

3. The system recited in claim 2 wherein said digital logic circuit means provides as an output signal, the pulse width modulated signal having a pulse width which is between the pulse width of the other two pulse width modulated signals received by said digital logic circuit means.

4. A system for reducing transient errors in transmitted data, said system comprising:
   means for storing a median data sample selected during a particular time interval;
   means for receiving first and second data samples during a subsequent time interval, said first and second data samples being serially displaced relative to each other within said subsequent time interval;
   means for comparing the first and second data samples independently with each other and with the median data sample including means for replacing said median data sample by said first data sample if the following logical conditions are satisfied, $(B>A)(A>C) + (B<A)(A<C)$, and for replacing said median data sample with said second data sample if the following logical conditions are satisfied, $(A>B)(B>C) + (A<B)(B<C)$, and for not replacing said median data sample by either of said first and second data samples if the following logical conditions are satisfied, $(B>C)(C>A) + (B<C)(C<A)$, where A and B are said first and second data samples respectively and where C is said median data sample.